(12) United States Patent
Charlot, Jr. et al.

(10) Patent No.: US 8,102,242 B2
(45) Date of Patent: Jan. 24, 2012

(54) AUTONOMOUS INTERROGATING TRANSPONDER FOR DIRECT COMMUNICATIONS WITH OTHER TRANSPONDERS

(75) Inventors: Lincoln H. Charlot, Jr., St. Petersburg, FL (US); David L. Acosta, St. Petersburg, FL (US); James H. Swindell, Indian Rocks Beach, FL (US)

(73) Assignee: XLINK Enterprises, Inc.

( * ) Notice: Subject to any disclaimer, the term of this patent is extended or adjusted under 35 U.S.C. 154(b) by 370 days.

(21) Appl. No.: 12/190,051

(22) Filed: Aug. 12, 2008

(65) Prior Publication Data

US 2008/0297352 A1 Dec. 4, 2008

Related U.S. Application Data

(62) Division of application No. 11/089,160, filed on Apr. 4, 2005, now Pat. No. 7,432,802.

(51) Int. Cl.
*H04Q 5/22* (2006.01)
(52) U.S. Cl. ............. 340/10.1; 340/539.22; 340/539.26; 340/572.1
(58) Field of Classification Search ................ 340/10.1, 340/10.2, 10.32, 10.33, 10.4, 539.22, 539.26, 340/572.1
See application file for complete search history.

(56) References Cited

U.S. PATENT DOCUMENTS

| | | | |
|---|---|---|---|
| 3,803,623 A | | 4/1974 | Charlot, Jr. |
| 5,450,492 A | * | 9/1995 | Hook et al. ............... 380/28 |
| 5,517,179 A | | 5/1996 | Charlot, Jr. |
| 5,525,992 A | * | 6/1996 | Froschermeier ............ 340/10.2 |
| 5,537,105 A | * | 7/1996 | Marsh et al. ............... 340/10.32 |
| 5,543,797 A | * | 8/1996 | Hochstein et al. ........... 340/10.2 |
| 5,565,858 A | | 10/1996 | Guthrie |
| 5,673,037 A | * | 9/1997 | Cesar et al. ............... 340/10.32 |
| 5,742,237 A | * | 4/1998 | Bledsoe ..................... 340/8.1 |
| 5,804,810 A | * | 9/1998 | Woolley et al. ............. 235/492 |
| 5,887,176 A | * | 3/1999 | Griffith et al. ............... 713/320 |

(Continued)

FOREIGN PATENT DOCUMENTS

JP  2009-261151 A1  3/1997

(Continued)

OTHER PUBLICATIONS

Chung et al., U.S. Appl. No. 60/605,287, filed Aug. 26, 2004, p. 8.*

(Continued)

*Primary Examiner* — Daniel Wu
*Assistant Examiner* — Rufus Point
(74) *Attorney, Agent, or Firm* — Edward W. Callan

(57) ABSTRACT

A group of associated transponders are respectively attached to a plurality of objects, such as sensors or containers. Each transponder includes a memory, a transmitter, a receiver and a controller. The memory stores group data, which includes data related to the respective attached objects. The controller causes the transmitter to autonomously transmit a group interrogation signal and to transmit a response signal in response to receipt of a group interrogation signal from another transponder of the group. The response signal includes at least some of the stored group data. The receiver receives both the group interrogation signals and the response signals from the other transponders of the group. The controller controls the transmitter and receiver and causes the memory to store data related to the respective object to which the transponder is attached and to store the group data included in the received response signals.

17 Claims, 3 Drawing Sheets

U.S. PATENT DOCUMENTS

| | | | | |
|---|---|---|---|---|
| 5,892,441 | A * | 4/1999 | Woolley et al. | 340/539.26 |
| D493,448 | S | 7/2004 | Charlot, Jr. | |
| 6,934,540 | B2 * | 8/2005 | Twitchell, Jr. | 455/422.1 |
| 7,005,985 | B1 | 2/2006 | Steeves | |
| 7,133,704 | B2 * | 11/2006 | Twitchell, Jr. | 455/574 |
| 7,271,727 | B2 * | 9/2007 | Steeves | 340/572.7 |
| 7,286,040 | B2 * | 10/2007 | Karabinis | 340/10.1 |
| 7,295,108 | B2 * | 11/2007 | Corrado et al. | 340/539.22 |
| 7,424,004 | B2 * | 9/2008 | Hattig | 370/349 |
| 7,538,670 | B2 * | 5/2009 | Smith et al. | 340/539.26 |
| 7,554,932 | B1 * | 6/2009 | Shurmantine et al. | 370/279 |
| 7,629,886 | B2 * | 12/2009 | Steeves | 340/572.1 |
| 2001/0036832 | A1 * | 11/2001 | McKay | 455/456 |
| 2004/0082296 | A1 * | 4/2004 | Twitchell, Jr. | 455/41.2 |
| 2006/0055552 | A1 * | 3/2006 | Chung et al. | 340/686.1 |
| 2006/0071758 | A1 * | 4/2006 | Cooper et al. | 340/10.2 |
| 2006/0158313 | A1 * | 7/2006 | Satou | 340/10.2 |
| 2006/0164213 | A1 * | 7/2006 | Burghard et al. | 340/10.2 |

FOREIGN PATENT DOCUMENTS

JP   2003-044974 A1   2/2003

OTHER PUBLICATIONS

JP Application No. 2008-505353, Notice of Reasons for Rejection dated Sep. 29, 2011. This application is a Japanese counterpart of U.S. Appl. No. 11/098,160, which is the parent of the present application.

JP Application No. 2008-505353, Claims.

* cited by examiner

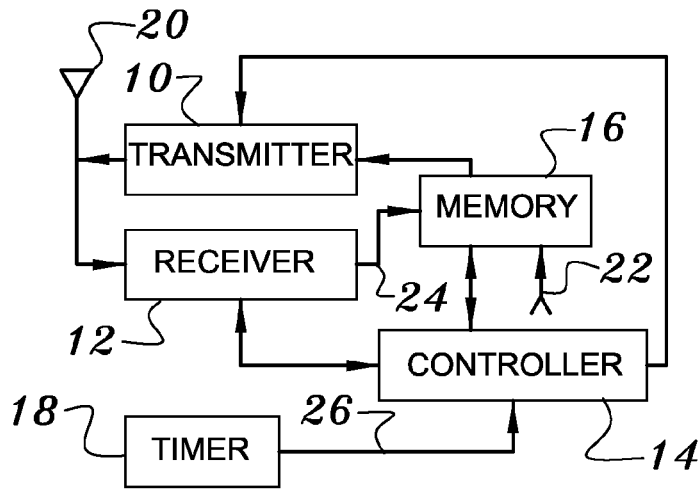
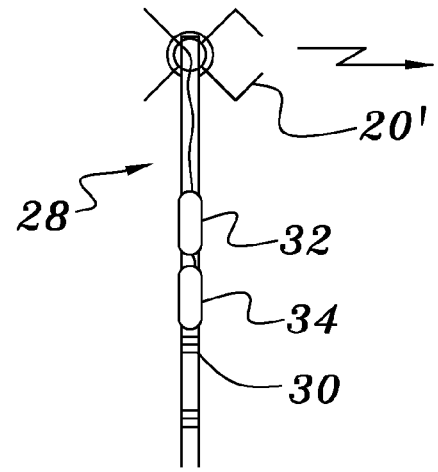
FIG. 1
FIG. 2
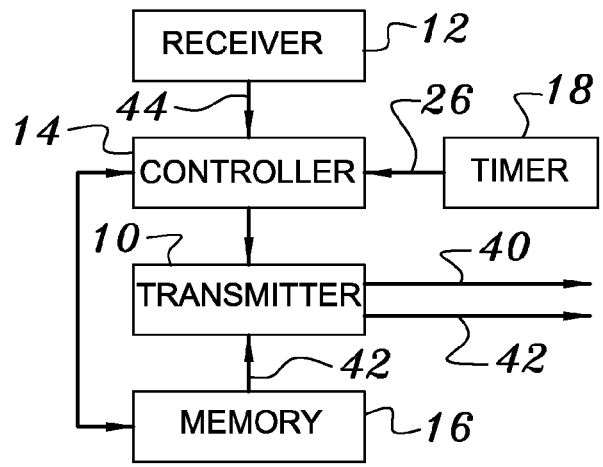
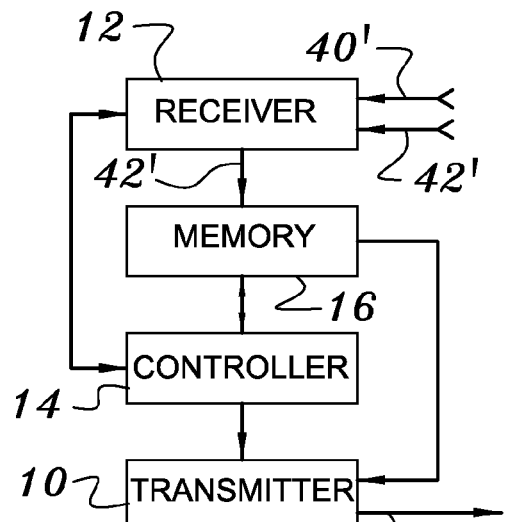
FIG. 3
FIG. 4
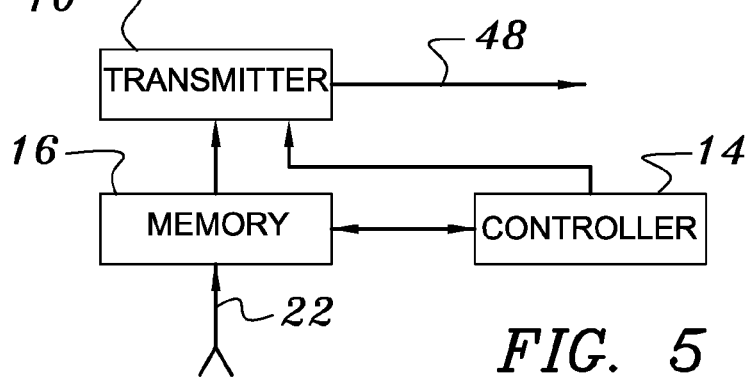
FIG. 5

AUTONOMOUS INTERROGATING TRANSPONDER FOR DIRECT COMMUNICATIONS WITH OTHER TRANSPONDERS

CROSS-REFERENCE TO RELATED APPLICATION

This is a division of co-pending application Ser. No. 11/098,160 filed Apr. 4, 2005.

BACKGROUND OF THE INVENTION

The present invention generally pertains to signal communications and is particularly directed to communications between transponders.

A typical prior art transponder includes means for receiving an interrogation signal and means for transmitting a response signal in response to receipt of the interrogation signal. In some transponder systems, a group of transponders are interrogated by an interrogation signal transmitted by a relatively high-power transmitter under the control of a single controller and the resultant response signals are received and monitored at the same location as the high-power transmitter.

Transponders are used for retrieving data pertaining to objects to which the transponders are attached. In some transponder systems, the retrieved data is provided to the transponders by attached sensors and then included in the response signal transmitted in response to receipt of an interrogation signal.

In other transponder systems, such as those used to detect theft attempts in retail stores, the transponder is attached to merchandise and transmits a response signal indicating the presence of the transponder and the merchandise attached thereto whenever the transponder is within an interrogation zone in which an interrogation signal can be received, which zone typically is located at a store exit.

In still other transponder systems, the transponder is programmed to respond to an interrogation signal by transmitting a response signal that identifies the object to which the transponder is attached. One such transponder system is used to identify and track the location of airborne aircraft. Another such transponder system utilizes transponders that are known as RFID tags. RFID tags are self contained and battery operated and include a microcontroller for data processing management.

RFID tags are used to identify objects to which the RFID tags are attached when such objects are within an interrogation zone in which the interrogation signal can be received. RFID tags are also used for safety and security applications. RFID tags are attached to many different types of objects. It is particularly advantageous to attach the RFID tags to cargo containers in order to track the location of the cargo containers that can be identified by the RFID tag transponder response signal as the cargo containers attached thereto are moved from one interrogation zone to another.

Problems in communicating with all of transponders that are respectively attached to a group of cargo containers sometimes arise when the containers of the group are stacked and/or closely situated on decks of ships or in freight yards. This problem arises because the usual stacking and close positioning of the containers sometimes either prevents some of transponders attached to the closely situated containers from receiving the interrogation signals, or prevents all of the response signals transmitted by the transponders attached to the containers from emerging out of the closely situated group of containers so that each response signal can be received and monitored.

SUMMARY OF THE INVENTION

The present invention provides a transponder comprising: a transmitter, a receiver and a controller; wherein the receiver is adapted for receiving a group interrogation signal; wherein the controller is adapted for causing the transmitter to transmit a response signal in response to receipt of said group interrogation signal and for causing the transmitter to transmit a said group interrogation signal; and wherein said transmission of the group interrogation signal is undertaken autonomously without outside control of the transponder.

The transponder of the present invention can act an interrogator during one communication step and as a responder during another communication step.

The present invention also provides a group of associated transponders respectively attached to a plurality of objects, wherein each transponder comprises: a memory for storing group data, wherein the stored group data includes data related to the respective objects to which the transponders of the group are attached; a transmitter, a receiver and a controller; wherein the receiver is adapted for receiving a group interrogation signal; wherein the controller is adapted for causing the transmitter to transmit a response signal in response to receipt of said group interrogation signal, wherein the response signal includes at least some of said stored group data; wherein the receiver is also adapted for also receiving said response signals from the other transponders of the group; and wherein the controller is also adapted for causing the memory to store data related to the respective object to which the transponder is attached and to store the group data included in said received response signals; wherein the controller is further adapted for causing the transmitter to transmit a said group interrogation signal and wherein said transmission of the group interrogation signal is undertaken autonomously without outside control of the transponder.

The present invention further provides a communication method for a group of transponders that are respectively attached to a plurality of objects, the method comprising the steps of:

(a) storing group data in each said transponder, wherein the stored group data includes data related to the respective objects to which the transponders of the group are attached;

(b) directly transmitting a group interrogation signal from each transponder of the group to at least one other transponder of the group;

(c) directly transmitting a response signal from at least one transponder of the group to at least one other transponder of the group in response to receipt of a said group interrogation signal by said at least one transponder, wherein the response signal includes said stored group data;

(d) receiving by at least one transponder of the group a said response signal from at least one other transponder of the group; and (e) causing each transponder of the group to also store the group data included in response signals received directly from at least one other transponder of the group;

wherein for step (b), said transmission of the group interrogation signal is undertaken autonomously without outside control of said any transponder from which the group interrogation signal is transmitted.

All of the transponders of the group do not have to be within communication range of every other transponder of the group, provided that each transponder is within communication range of at least one other transponder of the group.

The present invention overcomes the problem of communicating with all of the transponders of a group of transponders that are respectively attached a group of closely situated objects, such as cargo containers when the containers are stacked in closely situated groups. With the present invention all of the transponders of a group of transponders periodically interrogate at least one other transponder of the group and exchange group data until all of the transponders of the group store all of the group data related to the objects to which all of the transponders of the group are respectively attached. Accordingly, it is not necessary to interrogate the group of transponders with an interrogation signal transmitted from a location remote from the group of transponders; and the data related to all of the objects that are respectively attached to the transponders of the group can be monitored by receiving response signals from any one of the transponders.

The present invention also overcomes the problem of signal-loss conditions, which sometimes occurs between an individual pair of transponders due to phase cancellation or objects interfering with or occluding the signal path.

Additional features of the present invention are described with reference to the detailed description of the preferred embodiments.

BRIEF DESCRIPTION OF THE DRAWING

FIG. 1 is a block diagram of a preferred embodiment of a transponder according to the present invention.

FIG. 2 illustrates a preferred embodiment of a transponder assembly in which the transponder of FIG. 1 is attached to a sensor.

FIG. 3 is a diagram illustrating the portion of the operation of the transponder assembly of FIG. 2 that is initiated by the timer.

FIG. 4 is a diagram illustrating the portion of the operation of the transponder assembly of FIG. 2 that is initiated by receipt of a group interrogation signal.

FIG. 5 is a diagram illustrating the portion of the operation of the transponder assembly of FIG. 2 that is initiated by a change in the stored data that is related to the object that is attached to the transponder.

DETAILED DESCRIPTION

Figure 6:
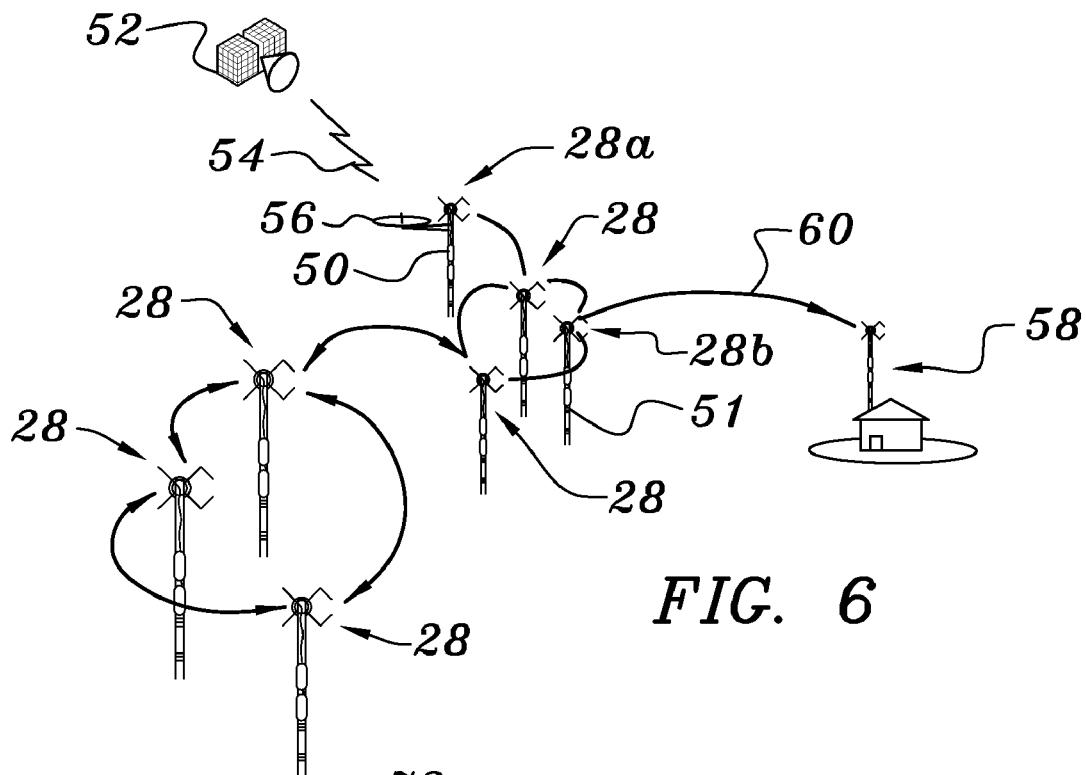
FIG. 6 illustrates a preferred embodiment of a group of the transponder assemblies shown in FIG. 2.

Referring to FIG. 1, a preferred embodiment of a transponder according to the present invention includes a transmitter 10, a receiver 12, a controller 14, a nonvolatile memory 16, a timer 18 and an antenna 20. In an alternative embodiment, some or all of the memory 16 may be volatile.

The controller 14 is adapted for causing the memory 16 to store group data. The group data includes data identifying the respective transponders of the group and/or the objects (not shown) to which the transponders are attached. The stored group data includes both contemporary data 22 related to the object to which the transponder is attached and data included in received signals 24 from another transponder in the group of like transponders, such as data received with group interrogation signals and data included in response signals received by the receiver 12.

The controller 14 is also adapted for causing the transmitter 10 to transmit group interrogation signals, response signals and data signals that include data stored in the memory 16. The transmitter causes the transmitted signals to be comprised of very short duty-cycle packets. The controller 14 also causes the signals transmitted by the transmitter 10 to be encoded and causes the signals received by the receiver 12 to be decoded and processed for error detection and correction.

The timer 18 periodically provides timing signals 26 to the controller 14 for initiating the transmission of the group interrogation signals by the transmitter 10.

Preferably, the transmitter 10 and the receiver 12 are embodied in a half-duplex communication device that is coupled to the antenna 20; and the controller 14, the memory 16 and the timer 18 are embodied in a microcontroller. In alternative embodiments the transmitter 10 and the receiver 12 may be embodied in a device other than a half-duplex communication device; and the controller 14, the memory 16 and the timer 18 may be embodied in a device or devices other than a microcontroller.

FIG. 2 illustrates a preferred embodiment of a transponder assembly 28 in which the transponder of FIG. 1 is attached to a sensor 30. The assembly 28 includes an antenna 20' of the type disclosed in U.S. Design Pat. No. D493,448 to Lincoln H. Charlot, Jr., the disclosure of which is incorporated by reference. The transmitter 10, the receiver 12, the controller 14, the memory 16 and the timer 18 are disposed in a first compartment 32 of the assembly 28; and a sensor electronics device that is appropriate for the type of transducer included in the sensor 30 is disposed in a second compartment 34 of the assembly 28. The sensor electronics device detects and processes the transducer signals from the sensor 30 to thereby provide sensed data signals to the microcontroller. The transponder assembly 28 also includes a battery for powering the operation of the components of the assembly 28.

In the embodiment of FIG. 2, the sensor 30 is adapted for sensing one or more environmental conditions; and the configuration of the transponder assembly 28 is adapted to facilitate the sensing of such environmental condition(s). In some alternative embodiments, the sensor 30 is adapted for sensing other conditions; and the configuration of the transponder assembly 28 is adapted to facilitate the sensing of such other conditions. Other alternative embodiments of the transponder assembly do not include a sensor and the group data merely identifies the respective attached objects.

Some alternative embodiments of transponder assembly include a different type of antenna, such as the microstrip antenna disclosed in U.S. Pat. No. 3,803,623 to Lincoln H. Charlot, Jr., the disclosure of which is incorporated by reference.

Referring to FIG. 3, the controller 14 causes the transmitter 10 to autonomously transmit a group interrogation signal 40 in response to a timing signal 26 from the timer 18 or whenever a connection between the transponder and the battery (not shown) is established or reestablished. The controller 14 is adapted for causing all data 42 currently stored in the memory 16 to be transmitted with the transmission of the group interrogation signal 40.

The controller 14 is also adapted for sensing when a signal 44 is being received by the receiver 12 from another transponder in a group of like transponders, and for delaying transmission of the group interrogation signal 40 until after the receipt of the received signal 44 is completed. The received signal 44 may be either an interrogation signal, a response signal or a signal that merely contains attached-object data related to an object that is attached to another transponder in a group of like transponders.

Referring to FIG. 4, the controller 14 is adapted for causing the transmitter 10 to transmit a response signal 46 in response to receipt by the receiver 12 of a group interrogation signal 40' from another transponder in a group of like transponders. The response signal 46 includes at least some of the contemporary group data stored in the memory 16. The controller 14 is also adapted for causing the memory 16 to store the data 42' that was transmitted with the received group interrogation signal 40' and received by the receiver 12.

All of the signals received by the receiver 12 are checked for errors; and if errors are found in the signals received by the receiver 12, the controller 14 prevents the memory 16 from storing the data in the received signal and prevents the transmitter 10 from transmitting a response signal 46 in response to a received signal that contains errors.

If no errors are found in a signal received by the receiver 12, the controller 14 determines whether or not the group data 42' in the received signal is different than the group data that was stored in the memory 16 upon the last previous receipt of a signal from another transponder in the group of transponders. When the controller 14 determines that the group data 42' in the received signal that is related to objects attached to other transponders in the group is different, the controller 14 causes the group data 42' in the received signal that is different and is related to objects attached to the other transponders in the group to be stored in the memory 16 as part of the currently stored group data.

When the controller 14 determines that the group data 42' received with the group interrogation signal 40' is different than the group data that was stored in the memory 16 upon the last previous receipt of a group interrogation signal 40', the controller 14 causes the transmitter 10 to transmit a response signal 46 in response to the group interrogation signal 40'. In the preferred embodiment, in order to conserve transmission time and bandwidth, the transmitted response signal 46 includes only the portion of the currently stored group data that is different than the group data that was stored in the memory 16 upon the last previous receipt of a group interrogation signal 40'.

Referring to FIG. 5, the contemporary attached-object data 22 stored in the memory 16 is refreshed from time to time. The controller 14 determines whether or not the contemporary attached-object data 22 derived from the sensor 30 has changed from the previously stored attached-object data 22 and causes the contemporary attached-object data 22 stored in the memory 16 to be stored in the memory 16 and transmitted by the transmitter 10 in an updated data signal 48 whenever the contemporary attached-object data 22 has changed from the previously stored attached-object data 22.

Referring to FIG. 6, a group of transponder assemblies 28, 28a, 28b are deployed for monitoring environmental conditions, such as flooding or hazardous materials spillage, over a wide area. In alternative embodiments such a group of transponder assemblies 28, 28a, 28b are deployed for monitoring other conditions.

The transponder assemblies 28, 28a, 28b are of the type described with reference to FIGS. 2-5, except that two of the transponder assemblies 28a, 28b each further includes a high-power transmitter 50, 51 for transmitting all of the group data stored in the memory of the respective transponder assembly 28a, 28b to a receiver at a remote location. The transmitters 50, 51 are "high-power" transmitters in the sense that they transmit at a higher power than the transmitter 10 of the transponder included in the transponder assemblies 28, 28a, 28b. The power rating of the respective high-power transmitter 50, 51 is determined in accordance with the amount of power required so that the group-data signals transmitted by the respective high-power transmitter 50, 51 can be reliably received at a particular remote location. A remote location is a location at which the interrogation and response signals transmitted by the transponders 10 of the group of transponder assemblies 28, 28a, 28b usually cannot be reliably received.

The controller of the transponder assembly 28a is adapted for causing the high-power transmitter 50 to transmit all of the group data stored in the memory of the transponder assembly 28a to a receiver in a communication satellite 52 via an uplink 54 to the communication satellite 52 from a high-gain satellite antenna 56 on the transponder assembly 28a.

The controller of the transponder assembly 28b is adapted for causing the high-power transmitter 51 to transmit all of the group data stored in the memory of the transponder assembly 28b to a receiver at a remote location 58 via a propagation path 60.

The group data can also be accessed by a receiver (not shown) at any location that is close enough to at least one transponder assembly of the group of the transponder assemblies 28, 28a, 28b to receive the interrogation and response signals that are transmitted from the transponder of the at least one transponder assembly.

In alternative embodiments (not shown), a high-power link is not provided to a communication satellite or a high-power propagation path is not provided to a remote ground location and/or a plurality of high-power propagation paths are provided to one or more remote ground locations and/or either none of the transponder assemblies includes a high-power transmitter or no receiver external to the group of transponders is close enough to any of the transponder assemblies of the group to receive the interrogation and response signals that are transmitted from any of the transponders of the group.

During the operation of the group of transponders included in the transponder assemblies 28, 28a, 28b of FIG. 6, the interrogation process begins with the most recently expiring randomly set transponder timer. All the transponders in this embodiment are of like construction, and the initial application of power to the respective transponders is random, so that the timers of the respective transponders are randomly started and full communication of the group data to all of the transponders of the group is eventually accomplished after transmission of group interrogation signals by all of the transponders of the group has been initiated by all of the respective timers.

When a group interrogation signal is received by any one of the other transponders of the group, a signal exchange takes place. If more than one transponder is within communication range of the transponder initially starting the process, and if the one transponder or the originating transponder is unable to decode the response signals due to signal clashing or interference, then the process starts over again when the timer in another transponder of the group initiates the transmission of a group interrogation signal from the other transponder.

If all the transponders of the group are within communication range of all of the other transponders of the group the total exchange of group data is delayed until transmission of group interrogation signals by all of the units in the group has been initiated by the respective randomly started timers in all of the transponders of the group. Signal clashing with the interrogation signals transmitted by any one transponder of the group is avoided because within the one transponder the controller is adapted for sensing when a signal is being received by the receiver, and the controller causes the transmission of the group interrogation signal by the transmitter to be delayed until after the receipt of the received signal has been completed, as described above with reference to FIG. 3.

Figure 7:
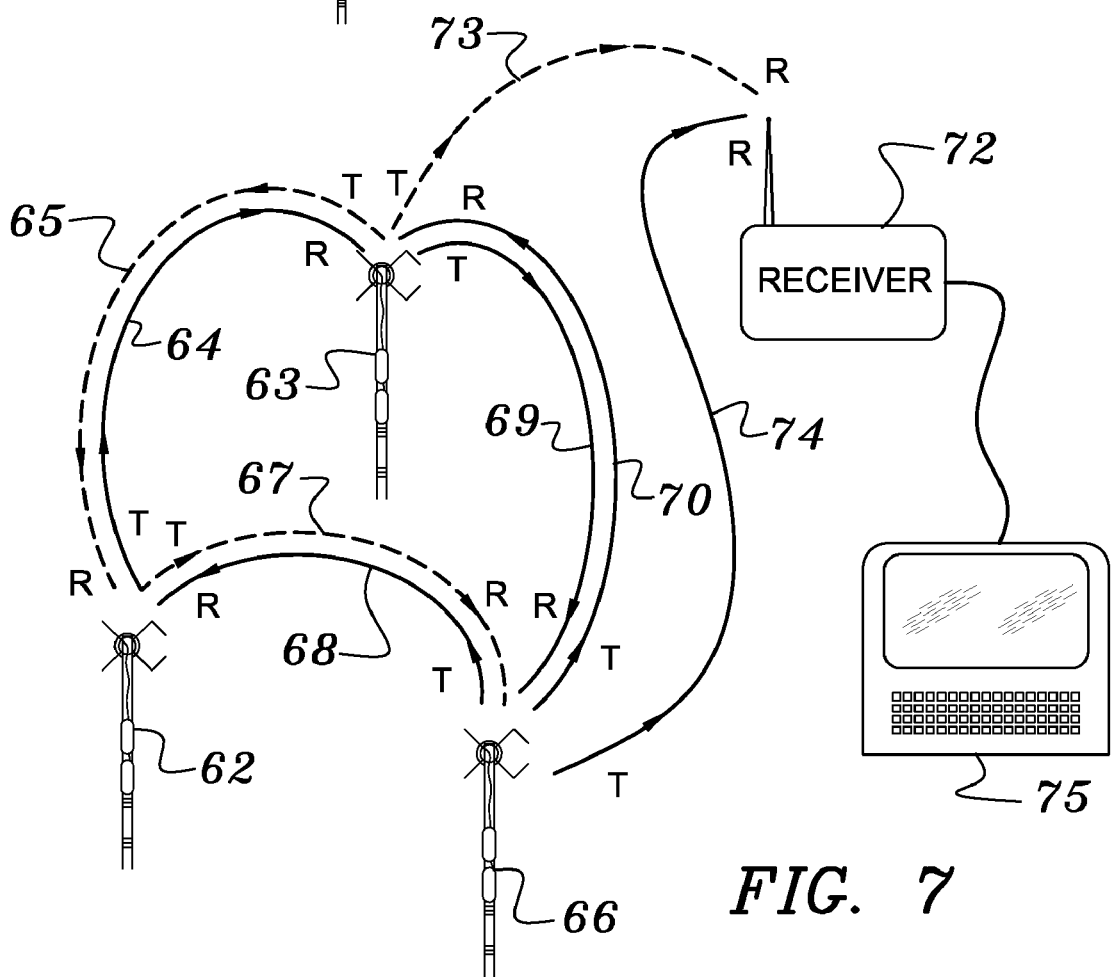
FIG. 7 illustrates the utility of the present invention in overcoming signal-loss conditions.

The utility of the present invention in overcoming signal-loss conditions is described with reference to FIG. 7, in which signal paths in each direction between individual pairs of transponder assemblies of the type described above are illustrated. For each signal path a T is displayed at the source of the transmission and an R is displayed at the destination Signals are transmitted by the transponder assembly 62 and received by the transponder assembly 63 via signal path 64; and signals are transmitted by the transponder assembly 63 and received by the transponder assembly 62 via signal path 65. Signals are transmitted by the transponder assembly 62 and received by the transponder assembly 66 via signal path 67; and signals are transmitted by the transponder assembly 66 and received by the transponder assembly 62 via signal path 68. Signals are transmitted by the transponder assembly 63 and received by the transponder assembly 66 via signal path 69; and signals are transmitted by the transponder assembly 66 and received by the transponder assembly 63 via signal path 70.

A receiver 72 is disposed close enough to two of the transponder assemblies 63 and 66 to receive interrogation and response signals transmitted by the transponder assemblies 63 and 66 via signal paths 73 and 74 respectively. A computer terminal 75 is connected to the receiver 72 for displaying the group data in the signals received by the receiver 72.

In an exemplary situation, signal-loss conditions are occurring in three of the signal paths 65, 67 and 73 (as shown by dashed lines). Because all of the transponders in all of the transponder assemblies 62, 63, 66 communicate all of the group data, the signal-loss condition in signal path 65 is overcome by the transmission of the group data from the transponder assembly 63 to the transponder assembly 62 via signal paths 69 and 68; the signal-loss condition in signal path 67 is overcome by the transmission of the group data from the transponder assembly 62 to the transponder assembly 66 via signal paths 64 and 69; and the signal-loss condition in signal path 73 is overcome by the transmission of the group data from the transponder assembly 66 to the receiver 72 via the signal path 74.

Figure 8:
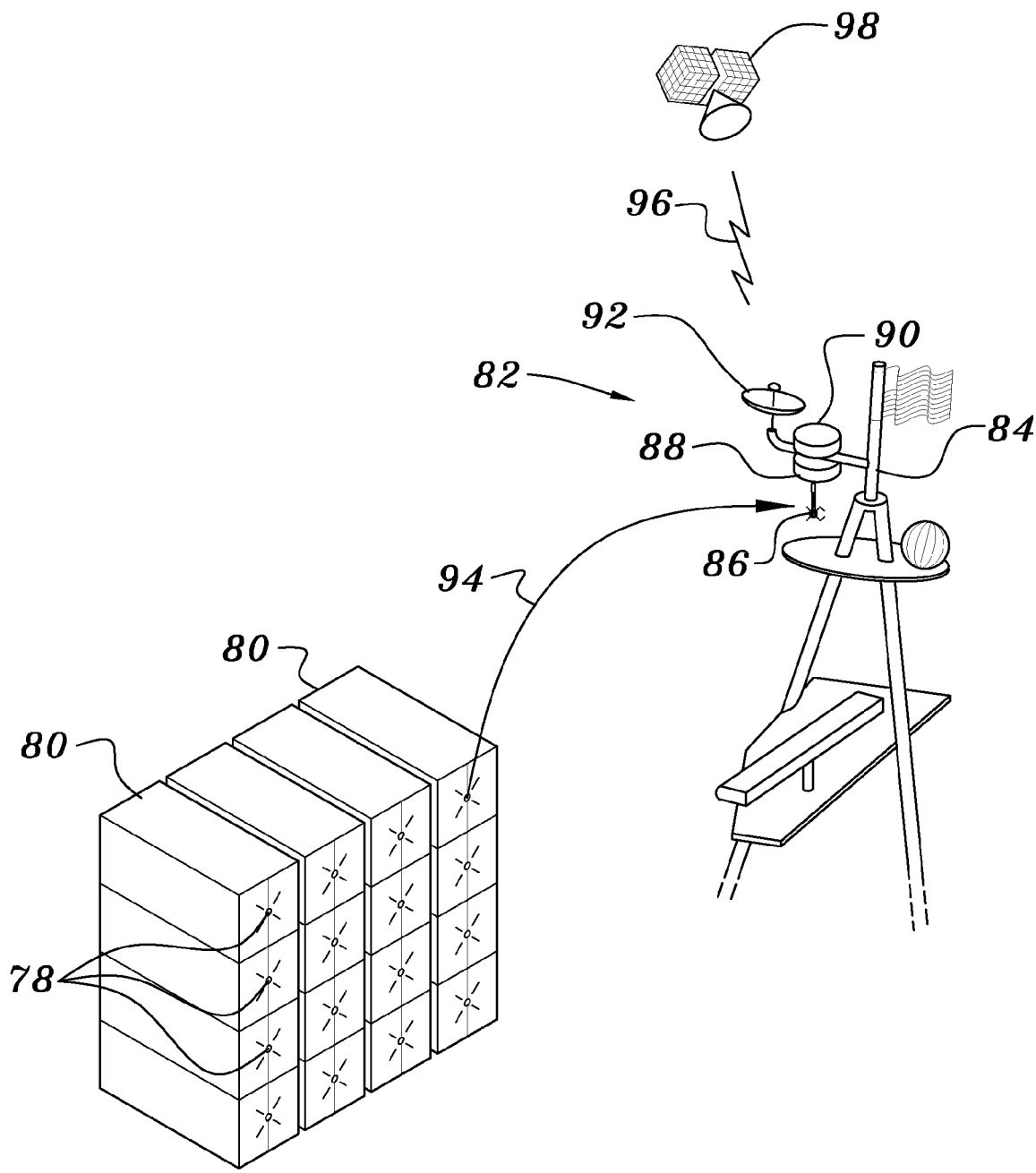
FIG. 8 illustrates a preferred embodiment of another group of transponders according to the present invention, wherein the transponders are respectively attached to closely situated objects, such as cargo containers.

Referring to FIG. 8, a group of transponder assemblies 78 are deployed for monitoring the respective presence within a particular area of each of a plurality of closely situated objects 80, such as cargo containers. The transponder assemblies 78 operate as described above with reference to FIGS. 2-5, and the preferred antenna is a microstrip antenna, such as disclosed in the aforementioned U.S. Pat. No. 3,803,623.

The transponder assemblies are attached to the objects 80 and the controller of each transponder of the group is operated to cause the identity of the object attached to the respective transponder to be entered into the memory of the respective transponder.

In some embodiments, sensors (not shown) are attached to one or more of the respective objects 80 to detect one or more characteristics of the object to which the sensor(s) are attached, such as temperature and/or the opening of the object, and the controller of the transponder 78 attached to the respective object is operated to cause data derived from the sensor(s) attached to the object to be entered into the respective memory.

In one preferred embodiment, the group of transponders 78 are combined with an external communication device 82 that is disposed apart from the group of transponder assemblies 78 and adapted for transmitting the group data to still another receiver (not shown) at a remote location. In the embodiment shown in FIG. 8, the external communication device 82 is mounted to the mast 84 of a ship that holds the objects to which the transponders of the group are attached. In alternative embodiments, the external communication device 82 may be mounted to something other than the mast of a ship and/or may be land based.

The external communication device 82 includes a receiving antenna 86, a receiver 88, a high-power transmitter 90 and a satellite antenna 92, which is coupled to the transmitter 90. The receiver 88 is coupled to the receiving antenna 86 for receiving the signals 94 that are transmitted by the transmitter of at least one transponder of the group. The high-power transmitter 90 is coupled to the receiver 88 and is adapted for transmitting to the receiver at the remote location the group data in the signals 86 that are received by the receiver 88. The group data is transmitted from the high-power transmitter 90 to the receiver at the remote location via the satellite antenna 92, an uplink 96 and a communication satellite 98. In alternative embodiments, the antenna that is coupled to the high-power transmitter for use in transmitting the group data to the receiver at the remote location may be other than a satellite antenna.

Except for the differences described above, the operation of the transponders included in the group of transponder assemblies 78 of FIG. 8 is substantially the same as the above-described operation of the group of transponders included in the transponder assemblies 28, 28a, 28b of FIG. 6.

For the above-described group-of-associated-transponders embodiments, (a) group data is stored in each transponder of the group; (b) a group interrogation signal is directly transmitted from each transponder of the group to at least one other transponder of the group; (c) a response signal including group data is directly transmitted from at least one transponder of the group to at least one other transponder of the group in response to receipt of a group interrogation signal by the at least one transponder; (d) at least one transponder of the group receives a response signal from at least one other transponder of the group; and (e) each transponder of the group also stores the group data included in response signals received directly from at least one other transponder of the group.

A group of associated transponders according to the present invention provides a high level of reliability because the operation of the group of transponders is not dependent upon a central transponder interrogator. In situations in which the transmitter of an individual transponder or the receiver of such transponder may be damaged or have its communications disrupted by signal jamming, the distributed communication aspect of the group of associated transponders alleviates the effect of such damage and disruptions.

The memory of each transponder of the group maintains a list of the transponders that transmits interrogation signals during each round of interrogation signals from the respective transponders of the group; and such list is included in the group data that is communicated between the transponders of the group. When it is detected by monitoring the group data at a location apart from the group of transponders that one transponder of the group is no longer transmitting interrogation signals, such detection indicates that the non-interrogating transponder (and inferentially the object attached thereto) has been moved to a location outside the communication range of the other transponders of the group.

Also, any other change in the data related to each transponder of the group and/or the object attached to such transponder can be monitored. An example of such a change is a sensed opening of a cargo container door. Since the changed data is eventually communicated to all of the transponders of the group, the monitoring of any one transponder of the group enables the sensed opening of the cargo container door to be detected so that appropriate and immediate physical security actions can be implemented.

In various alternative embodiments, the transponders are adapted for radio frequency (RF) communications, light-beam communications and/or wired communications of the group interrogation signals, the response signals and/or the other signals communicated by the transponders of the group.

In still other embodiments the various aspects of the different embodiments described herein are combined with one another to the extent that they are not incompatible with each other.

The advantages specifically stated herein do not necessarily apply to every conceivable embodiment of the present invention. Further, such stated advantages of the present invention are only examples and should not be construed as the only advantages of the present invention. While the above description contains many specificities, these should not be construed as being necessarily required for use of the present invention or as limitations on the scope of the present invention, but rather as examples of the embodiments described herein. Other variations are possible and the scope of the present invention should be determined not by the embodiments described herein but rather by the claims and their legal equivalents.

Regarding the method claims, except for those steps that can only occur in the sequence in which they are recited, and except for those steps for which the occurrence of a given sequence is specifically recited or must be inferred, the steps of the method claims do not have to occur in the sequence in which they are recited.

The invention claimed is:

1. A transponder comprising:
    a transmitter, a receiver and a controller;
    wherein the receiver is adapted for receiving one group interrogation signal;
    wherein the controller is adapted for causing the transmitter to transmit a response signal in response to receipt of said one group interrogation signal and for causing the transmitter to transmit another group interrogation signal and
    wherein said transmission of the other group interrogation signal is undertaken autonomously without outside control of the transponder.

2. A transponder according to claim 1, wherein the transponder is a half-duplex communication device.

3. A transponder according to claim 1, further comprising:
    a memory for storing data;
    wherein the controller is adapted for causing the memory to store data related to an object to which the transponder is attached; and
    wherein the response signal includes at least some of the data stored in the memory.

4. A transponder according to claim 3, wherein the receiver is adapted for receiving both said group interrogation signals and signals from other transponders of a group associated like transponders.

5. A transponder according to claim 4, wherein the controller is further adapted for causing the memory to store the data included in said signals received by the receiver from said other transponders in the group.

6. A transponder according to claim 5, in combination with a high-power transmitter;
    wherein the controller is adapted for causing the high-power transmitter to transmit data stored in the memory to a receiver at a remote location.

7. A transponder according to claim 4, wherein the controller is adapted for causing the memory to store contemporary data related to an object to which the transponder is attached.

8. A transponder according to claim 7, wherein the controller is further adapted for causing the current attached-object data stored in the memory to be transmitted by the transmitter whenever the contemporary attached-object data has changed from the previously stored attached-object data.

9. A transponder according to claim 1, further comprising:
    a timer for initiating said transmission of said group interrogation signals;
    wherein the controller is adapted for sensing when a signal is being received by the receiver, and for delaying transmission of a said group interrogation signal until after receipt of a said received signal is completed.

10. A transponder according to claim 1, wherein the transponder is adapted for radio frequency (RF) communications, light-beam communications and/or wired communications of the group interrogation signals and/or the response signals.

11. A group of associated transponders respectively attached to a plurality of objects, wherein each transponder comprises:
    a memory for storing group data, wherein the stored group data includes data related to the respective objects to which the transponders of the group are attached;
    a transmitter, a receiver and a controller;
    wherein the receiver is adapted for receiving a group interrogation signal;
    wherein the controller is adapted for causing the transmitter to transmit a response signal in response to receipt of said group interrogation signal, wherein the response signal includes at least some of said stored group data;
    wherein the receiver is also adapted for also receiving said response signals from the other transponders of the group; and
    wherein the controller is also adapted for causing the memory to store data related to the respective object to which the transponder is attached and to store the group data included in said received response signals;
    wherein the controller is further adapted for causing the transmitter to transmit a said group interrogation signal and
    wherein said transmission of the group interrogation signal is undertaken autonomously without outside control of the transponder.

12. A group according to claim 11, in combination with a plurality cargo containers, wherein said cargo containers are the objects to which the transponders are respectively attached.

13. A group according to claim 11, in combination with a plurality of flood-control-system sensors, wherein said sensors are the objects to which the transponders are respectively attached.

14. A group according to claim 11, in combination with:
    an external receiver disposed apart from the group of transponders for receiving the signals transmitted by the transmitter of at least one transponder of the group; and
    a high-power transmitter coupled to the separate receiver for transmitting to still another receiver at a remote location the group data in the signals received by the separate receiver.

15. A communication method for a group of transponders that are respectively attached to a plurality of objects, the method comprising the steps of:

(a) storing group data in each said transponder, wherein the stored group data includes data related to the respective objects to which the transponders of the group are attached;
(b) directly transmitting a group interrogation signal from each transponder of the group to at least one other transponder of the group;
(c) directly transmitting a response signal from at least one transponder of the group to at least one other transponder of the group in response to receipt of a said group interrogation signal by said at least one transponder, wherein the response signal includes, said stored group data;
(d) receiving by at least one transponder of the group a said response signal from at least one other transponder of the group; and
(e) causing each transponder of the group to also store the group data included in response signals received directly from at least one other transponder of the group;
wherein for step (b), said transmission, of the group interrogation signal is undertaken without outside control of said any transponder from which the group interrogation signal is transmitted.

16. A method according to claim 15, wherein the objects to which the transponders are respectively attached are cargo containers.

17. A method according to claim 15, wherein the objects to which the transponders are respectively attached are flood-control-system sensors.

* * * * *